(12) United States Patent
Bessyo et al.

(10) Patent No.: US 7,987,731 B2
(45) Date of Patent: Aug. 2, 2011

(54) ULTRASONIC FLOWMETER INCLUDING AN OSCILLATION START UNIT FOR ACCELERATION STABILITY OF THE OSCILLATOR

(75) Inventors: Daisuke Bessyo, Nara (JP); Fumikazu Shiba, Nara (JP); Koichi Takemura, Nara (JP)

(73) Assignee: Panasonic Corporation, Osaka (JP)

( * ) Notice: Subject to any disclaimer, the term of this patent is extended or adjusted under 35 U.S.C. 154(b) by 183 days.

(21) Appl. No.: 12/521,443

(22) PCT Filed: Apr. 26, 2007

(86) PCT No.: PCT/JP2007/059117
§ 371 (c)(1),
(2), (4) Date: Jun. 26, 2009

(87) PCT Pub. No.: WO2008/081610
PCT Pub. Date: Jul. 10, 2008

(65) Prior Publication Data
US 2010/0319464 A1    Dec. 23, 2010

(30) Foreign Application Priority Data
Dec. 27, 2006 (JP) .............................. P2006-351251

(51) Int. Cl.
*G01F 1/66* (2006.01)
(52) U.S. Cl. .................................................. 73/861.28
(58) Field of Classification Search .................. None
See application file for complete search history.

(56) References Cited

U.S. PATENT DOCUMENTS

| 3,894,431 | A | * | 7/1975 | Muston et al. ............. 73/861.29 |
| 4,308,754 | A | * | 1/1982 | Pedersen et al. ........... 73/861.28 |
| 4,782,282 | A | * | 11/1988 | Bachman ..................... 324/668 |
| 6,065,351 | A | * | 5/2000 | Nagaoka et al. ........... 73/861.28 |
| 7,027,936 | B2 | * | 4/2006 | Ploug-Soerensen et al. ... 702/48 |
| 7,082,841 | B2 | * | 8/2006 | Umekage et al. ........... 73/861.27 |
| 2005/0000301 | A1 | * | 1/2005 | Umekage et al. ........... 73/861.27 |

FOREIGN PATENT DOCUMENTS

| JP | 51123044 A | 10/1976 |
| JP | 54041058 A | 3/1979 |
| JP | 08122117 A | 5/1996 |
| JP | 09133562 A | 5/1997 |
| JP | 2001320237 A | 11/2001 |
| JP | 2003008403 A | 1/2003 |
| JP | 2003315124 A | 11/2003 |

OTHER PUBLICATIONS

International Search Report for International Application No. PCT/JP2007/059117, dated Jun. 26, 2007, 2 pages.

* cited by examiner

*Primary Examiner* — Harshad Patel
(74) *Attorney, Agent, or Firm* — Brinks Hofer Gilson & Lione

(57) ABSTRACT

The present invention provides an ultrasonic flowmeter comprising an oscillator and an oscillation start unit for accelerating oscillation of the oscillator. The oscillation start unit accelerates the oscillation of the oscillator so that pulses from the oscillator will become stable in a shorter time period. The accuracy of flow rate measurement is improved. Electric power can be saved where the flow rate is measured repeatedly at intervals.

8 Claims, 10 Drawing Sheets

FIG. 8  Prior Art
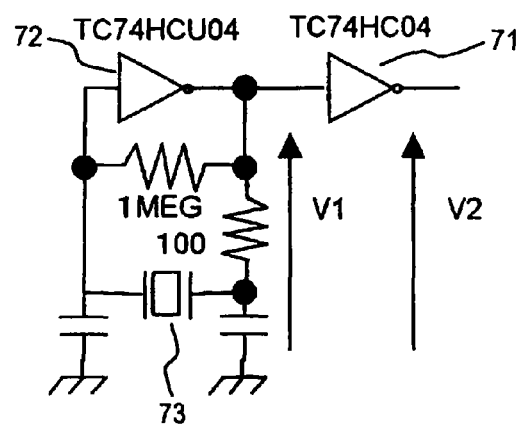
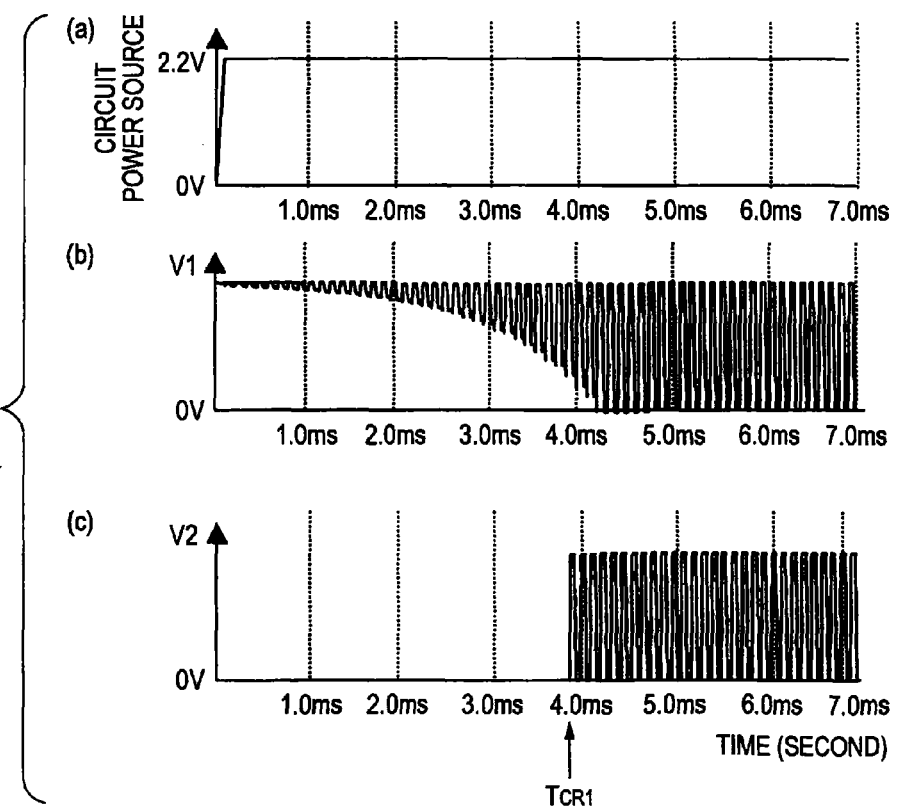
FIG. 9 Prior Art

ULTRASONIC FLOWMETER INCLUDING AN OSCILLATION START UNIT FOR ACCELERATION STABILITY OF THE OSCILLATOR

TECHNICAL FIELD

The present invention relates particularly to an ultrasonic flowmeter for measuring a flow rate by ultrasonic waves.

BACKGROUND ART

A conventional ultrasonic flowmeter is described in, for example, Patent Reference 1. FIG. 6 is a control block diagram showing a first example of the conventional ultrasonic flowmeter described in Patent Reference 1.

In the ultrasonic flowmeter of FIG. 6, a first oscillator 5 for sending ultrasonic waves on the way to a fluid pipe line 4 and a second oscillator 6 for receiving the ultrasonic waves are arranged in a flow direction. Also, the ultrasonic flowmeter comprises a sending circuit 7 to the first oscillator 5, and an amplification circuit 8 of a signal received by the second oscillator 6. Then, the ultrasonic flowmeter has a configuration in which a signal amplified by the amplification circuit 8 is compared with a reference signal by a comparison circuit 9 and time from sending to receiving is obtained by a time counting unit 10 such as a timer counter and a flow rate value is obtained by a flow rate calculation unit 11 in consideration of a state of a flow or a size of the pipe line according to its ultrasonic propagation time and timing of signal sending to a trigger unit 13 of the sending circuit 7 is adjusted by a value of this flow rate calculation unit 11.

Next, its operation will be described. A burst signal is sent out of the sending circuit 7 based on instructions from the trigger unit 13 and an ultrasonic signal sent by the first oscillator 5 according to this burst signal propagates through a flow and is received by the second oscillator 6. Then, the received signal is processed by the amplification circuit 8 and the comparison circuit 9 and time from sending to receiving is measured by the time counting unit 10.

When a sound in static fluid is set at c and a speed of a fluid flow is set at v, an ultrasonic propagation speed of a forward direction of the flow becomes (c+v). When a distance between the oscillators 5 and 6 is set at L and an angle between the ultrasonic propagation axis and the central axis of a pipe line is set at $\phi$, ultrasonic arrival time T is as follows, $$T = L/(c+v \cos \phi) \quad (1)$$

and the following formula is obtained from the formula (1), $$v = (L/T - c)/\cos \phi \quad (2)$$

and when L and $\phi$ are known, a flow speed v is obtained by measuring T. From this flow speed, a flow rate Q is obtained by the following formula when a passage area is set at S and a correction factor is set at K.

$$Q = KSv \quad (3)$$

FIG. 7 is a control block diagram showing a fourth example of the conventional ultrasonic flowmeter described in Patent Reference 1. In the ultrasonic flowmeter of FIG. 7, repeats of sending to receiving are done by the number of repeats set in a repeat setting unit 16 by a repeat unit 15 and switching between sending and receiving is further performed by a switching unit 17 and thereafter, repeats are similarly done. That is, when ultrasonic waves are generated from a first oscillator 4 by a sending circuit 7 and the ultrasonic waves are received by a second oscillator 5 and a received signal arrives at a comparison circuit 9 through an amplification circuit 8, the sending circuit 7 is again triggered by a trigger unit 13 by instructions of the repeat unit 16. This repeat is done by the number of repeats set in the repeat setting unit 15 and when the number of set repeats is reached, time taken to do the repeats is measured by the time counting unit 10. Thereafter, sending and receiving of the first oscillator 4 and the second oscillator 5 are connected in reverse by the switching unit 17 and in turn, ultrasonic waves are sent from the second oscillator toward the first oscillator 5 and in a manner similar to the above, arrival time is obtained and this difference is obtained and a flow rate value is calculated by the flow rate calculation unit 11.

When a sound in static fluid is set at c and a speed of a fluid flow is set at v, an ultrasonic propagation speed of a forward direction of the flow becomes (c+v) and a propagation speed of a backward direction becomes (c−v). When a distance between the oscillators 7 and 8 is set at L and an angle between the ultrasonic propagation axis and the central axis of a pipe line is set at 4) and the number of repeats is set at n, respective repeat times T1 and T2 of the forward direction and the backward direction are as follows, $$T1 = n \times L/(c+v \cos \phi) \quad (4)$$

$$T2 = n \times L/(c-v \cos \phi) \quad (5)$$

and the following formula is obtained from the formulas (4) and (5), $$v = n \times L/2\cos \phi \times (1/T1 - 1/T2) \quad (6)$$

and when L and $\phi$ are known, a flow speed v is obtained by measuring T1 and T2.

However, when a flow rate is small and the number of repeats is small, a difference between T1 and T2 is extremely minute and it is difficult to accurately measure the difference, so that the number of measurements is largely set and an error is relatively decreased. Also, when the flow rate becomes large, the difference of T1-T2 also becomes large, so that it becomes easy to measure the difference and in that case, the number of repeat settings is decreased and a sampling interval is quickened and the error is decreased. That is, the number of repeats of the repeat setting unit 15 is changed by the flow rate calculation unit 11.

The ultrasonic flowmeter of this Patent Reference 1 has a method for switching between sending and receiving using two oscillators and obtaining a flow speed from ultrasonic propagation times obtained from respective received waveforms and calculating a flow rate.

Patent Reference 1: JP-A-8-122117

DISCLOSURE OF THE INVENTION

Problems that the Invention is to Solve

Measurement of propagation time of ultrasonic waves is obtained by counting the number of pulses generated by an oscillator as an oscillation element. For example, in the case of using a crystal oscillator with $4 \times 10^6$ Hz (a cycle is the reciprocal of a frequency and is $0.25 \times 10^{-6}$ second) as the oscillator, propagation time becomes $180 \times 10^{-6}$ second when there are 720 pulses in the propagation time. The crystal oscillator becomes a measurable state after the crystal oscillator oscillates from an operation start of a circuit to which its crystal oscillator is connected and an amplitude of oscillation increases and a clear pulse waveform is obtained and time taken to stabilize this pulse cycle or duty has elapsed.

This respect will be described using the drawings. When a waveform is measured using a product number SMD49TA4M (for $4\times10^6$ Hz) of a crystal oscillator made by Daishinku Corporation as an oscillator 70 in an oscillation circuit of FIG. 8, a waveform diagram of FIG. 9 is obtained. The axis of abscissa of FIG. 9 is time (second), and (*a*) in FIG. 9 shows a power source voltage supplied to a circuit, and increases slowly in order to charge a capacitor inserted for voltage stabilization. In the case of reaching a voltage on which a buffer 71 (TC74HC04 made by Toshiba Corporation) and an unbuffer 72 (TC74HCU04 made by Toshiba Corporation) of a circuit can operate, an output voltage V1 of the unbuffer 72 (TC74HCU04) of (*b*) in FIG. 9 appears and an amplitude of its oscillation increases gradually. This voltage V1 is inputted to the buffer 71 (TC74HC04) and when V1 exceeds a threshold voltage of this buffer 71, an output voltage V2 of a rectangular wave is outputted from the buffer 71 at time $T_{CR1}=4\times10^{-3}$ second as shown in FIG. 9, (*c*). Some time $T_{CR2}$ taken to stabilize a cycle of this rectangular wave after the output voltage V2 of the rectangular wave is outputted is required.

FIG. 10 is a graph showing a change in a cycle of this rectangular wave after the output voltage V2 of the rectangular wave is outputted, and the axis of abscissa is time (second) and the axis of ordinate is a pulse cycle (second). In the case of seeing this FIG. 10, time $T_{CR2}$ necessary to stabilize the cycle at $0.25\times10^{-6}$ second is about $1\times10^{-3}$ second.

As a result of this, it is necessary to previously start up a crystal oscillator before measurement of propagation time of ultrasonic waves is started. This time is $T_{CR1}+T_{CR2}$ and requires about $5\times10^{-3}$ second. In an ultrasonic flowmeter using a battery as an electric power source, electric power savings are strongly desired. As a result of this, in the measurement of propagation time of ultrasonic waves, control made by intermittent measurement every, for example, $4\times10^{-3}$ second is performed.

However, when the crystal oscillator is used in measurement of propagation time of ultrasonic waves, stability of a pulse capable of being used in measurement cannot be obtained unless the crystal oscillator is started up before $5\times10^{-3}$ second capable of being used in measurement as described above. Therefore, when measurement intervals are $4\times10^{-3}$ second, the crystal oscillator cannot be stopped and it becomes necessary to continuously operate the crystal oscillator. Since power consumption by a circuit for operating the crystal oscillator is large, a continuous operation of the crystal oscillator becomes a problem in the case of achieving electric power savings.

The oscillator includes a ceramic oscillator in addition to the crystal oscillator. Activation of the ceramic oscillator is quicker than that of the crystal oscillator. When a waveform is measured using a product number EFOMC400AR (for $4\times10^6$ Hz) of the ceramic oscillator made by Matsushita Electric Industrial Co., Ltd. as an oscillator 73 in an oscillation circuit of FIG. 11, a waveform diagram of FIG. 12 is obtained. The axis of abscissa of FIG. 12 is time (second), and (*a*) in FIG. 12 shows a power source voltage supplied to a circuit, and increases slowly in order to charge a capacitor inserted for voltage stabilization. In the case of reaching a voltage on which a buffer 71 and an unbuffer 72 of a circuit can operate, oscillation appears in an output voltage V1 of the unbuffer 72 of (*b*) in FIG. 12 and an amplitude of its oscillation increases gradually. This voltage V1 is inputted to the buffer 71 and when V1 exceeds a threshold voltage of this buffer 71, an output voltage V2 of a rectangular wave is outputted from the buffer 71 at time $T_{CE1}=44\times10^{-6}$ second as shown in FIG. 12 (*c*). Some time $T_{CE2}$ taken to stabilize a cycle of this rectangular wave after the output voltage V2 of the rectangular wave is outputted is required.

FIG. 13 is a graph showing a change in a cycle of this rectangular wave after the output voltage V2 of the rectangular wave is outputted, and the axis of abscissa is time (second) and the axis of ordinate is a cycle (second). In the case of seeing this FIG. 13, time $T_{CE2}$ necessary to stabilize the cycle at $0.25\times10^{-6}$ second is about $5\times10^{-5}$ second.

As a result of this, it is necessary to previously start up the ceramic oscillator before measurement of propagation time of ultrasonic waves is started. This time is $T_{CE1}+T_{CE2}$ and requires about $9.4\times10^{-5}$ second. The extent of this stability is the extent of stability determined from ambient environment or a measuring device for measuring a cycle in the same experiment. In the case of making actual measurement of propagation time of ultrasonic waves using the ceramic oscillator and then calculating a flow rate, a standard deviation of the flow rate is shown in FIG. 14 when waiting time taken to start measurement after a power source of an oscillation circuit of the ceramic oscillator is turned on is obtained as a parameter. As can be seen from FIG. 14, the standard deviation of the flow rate becomes small at about $200\times10^{-6}$ second or more and is stable.

Thus, when the ceramic oscillator is used as the oscillator, activation of the oscillator becomes extremely quicker than that of the crystal oscillator, but about $200\times10^{-6}$ second or more is required still, so that a problem is to accelerate stable oscillation and activation of the ceramic oscillator further in order to achieve electric power savings.

Also, in consideration of a change in working temperature range or variations between individual pieces, oscillation frequency accuracy of the crystal oscillator is ±0.001% but oscillation frequency accuracy of the ceramic oscillator is ±0.5% and there is a problem in absolute time accuracy in the case of using the ceramic oscillator.

Means for Solving the Problems

An ultrasonic flowmeter of the invention uses an oscillation start unit in order to accelerate an oscillation start of an oscillator used in measurement of propagation time of ultrasonic waves and enhance stability of an oscillation pulse. The oscillation start unit comprises an oscillation circuit for generating a pulse of a frequency close to an oscillation frequency of the oscillator used in measurement, and the oscillator used in measurement of propagation time of ultrasonic waves is energized by the pulse generated by its oscillation circuit.

We confirmed that such oscillation start unit not only accelerates an oscillation start of an oscillator but also accelerates time for which a frequency (cycle) of oscillating pulses is stabilized, and confirmed that sufficient flow rate measurement accuracy and electric power savings can be achieved when this oscillation start unit is applied to the ultrasonic flowmeter and a flow rate is measured.

Also, we use a ceramic oscillator in an oscillator used in measurement of propagation time of ultrasonic waves to solve low oscillation frequency accuracy of the ceramic oscillator. For this purpose, it is constructed so that a crystal oscillator oscillating at a frequency lower than that of the ceramic oscillator used in the measurement of propagation time is disposed and a pulse cycle of the ceramic oscillator is verified by a pulse of the crystal oscillator oscillating at the lower frequency to calibrate the propagation time. Concretely, the actual ultrasonic flowmeter is equipped with a circuit for measuring ultrasonic waves and a microcomputer for controlling this circuit and controlling flow rate display etc., and the microcomputer operates always and as an oscillator for operating this, for example, a crystal oscillator with $32 \times 10^3$ Hz is used. Hence, using this crystal oscillator with $32 \times 10^3$ Hz, a ceramic oscillator with $4 \times 10^6$ Hz for measuring ultrasonic waves is verified to calibrate the propagation time.

BRIEF DESCRIPTION OF THE DRAWINGS

FIG. 8 is an oscillation circuit of a conventional crystal oscillator.

FIG. 9 is a characteristic diagram of the oscillation circuit of the conventional crystal oscillator.

DESCRIPTION OF REFERENCE NUMERALS AND SIGNS

60 OSCILLATOR (OSCILLATOR A)
61 OSCILLATION START UNIT
63 OSCILLATOR (OSCILLATOR B)

BEST MODE FOR CARRYING OUT THE INVENTION

First Embodiment

An ultrasonic flowmeter in a first embodiment of the invention comprises an oscillator and an oscillation start unit for accelerating oscillation of the oscillator, and is constructed so as to use a pulse of the oscillator oscillated by the oscillation start unit in measurement of propagation time of ultrasonic waves.

Figure 1:
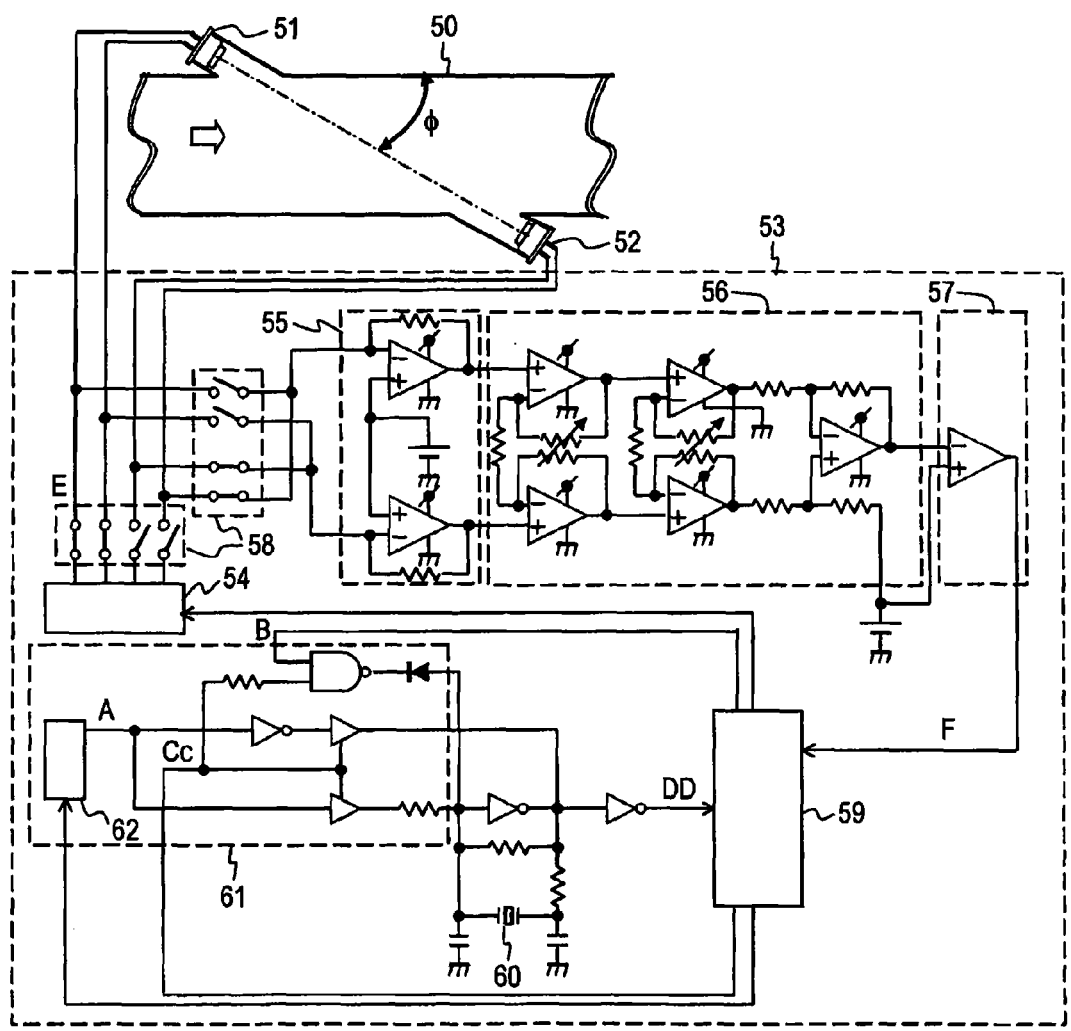
FIG. 1 is a circuit block diagram showing a structure of an ultrasonic flowmeter of the invention.

FIG. 1 is a circuit block diagram showing a configuration of the ultrasonic flowmeter in the first embodiment of the invention.

In FIG. 1, a flow path 50 is a pipe through which fluid flows, and ultrasonic sensors 51, 52 are disposed on the way. The ultrasonic sensors 51, 52 are connected to a printed substrate in which a control part 53 is disposed by lead wires. The control part 53 made by having a sending circuit 54 for supplying a sending signal to the ultrasonic sensors 51, 52, a receiving circuit 55 for transmitting a signal from the ultrasonic sensors 51, 52, an amplification circuit 56 for amplifying an output of the receiving circuit 55 and a comparison circuit 57 for comparing an output of the amplification circuit 56 with a DC voltage is disposed in the printed substrate.

A switch group 58 is disposed in order to switch between sending and receiving of the ultrasonic sensors 51, 52, and is in a state in which the ultrasonic sensor 51 is connected to the sending circuit 54 and the ultrasonic sensor 52 is connected to the receiving circuit 56 in FIG. 1. A calculation processing circuit 59 transmits a sending command to the sending circuit 54 and drives the ultrasonic sensor 51. When the ultrasonic sensor 52 receives ultrasonic waves sent from the ultrasonic sensor 51, its received signal is processed by the receiving circuit 55 and the amplification circuit 56 and a signal is outputted from the comparison circuit 57.

The signal from the comparison circuit 57 is transmitted to the calculation processing circuit 59, and the calculation processing circuit 59 measures time taken to transmit the signal from the comparison circuit 57 from sending of the ultrasonic sensor 51. In this time measurement, pulses formed by an oscillator 60 are used and the number of pulses during a propagation period of ultrasonic waves is counted and time is calculated. Here, as an oscillation frequency of the oscillator 60, for example, the oscillation frequency of $4 \times 10^6$ Hz ($0.25 \times 10^{-6}$ second) is selected. The oscillator 60 is energized by an oscillation start unit 61. The oscillation start unit 61 is configured to have another oscillation unit 62 and a circuit for energizing pulses of this oscillation unit 62 to the oscillator 60 for a certain period.

This another oscillation unit 62 is unit of generating a pulse with a frequency substantially equal to a frequency of the oscillation unit 60, and is constructed of a ring oscillator since it is desirable to generate a pulse instantaneously. Since frequency accuracy of the ring oscillator is not good, the ring oscillator cannot be used in measurement, but the ring oscillator can be utilized sufficiently for the purpose of energizing the oscillator 60 and accelerating an oscillation start of the oscillator 60 and accelerating stability of duty or an oscillation frequency.

A method for accelerating an operation start of an oscillator using such a ring oscillator is described in, for example, U.S. Pat. No. 6,819,195B1. The same patent is a method for energizing an oscillator while adjusting a frequency of a ring oscillator, and we confirm that such a method has an effect of accelerating stability of a pulse cycle.

Incidentally, other methods for reducing time taken to enable the pulse to be used from activation of an oscillator are introduced. For example, JP-A-11-163632 of Japanese Patent is not a method for energizing an oscillator, so that it is undesirable since an effect of accelerating stability of a pulse cycle cannot be expected even when time to a pulse output is reduced.

According to the first embodiment thus, by disposing the oscillation start unit 61, an oscillation start of the oscillator 60 used in measurement of propagation time of ultrasonic waves by the ultrasonic sensors 51, 52 can be accelerated and stability of an oscillation pulse can be enhanced. Consequently, stable measurement of propagation time of ultrasonic waves can be started instantaneously, so that high-accuracy measurement can be made intermittently and electric power savings in the ultrasonic flowmeter can be achieved.

Second Embodiment

An ultrasonic flowmeter in a second embodiment of the invention is constructed so that a driving signal is given to an ultrasonic sensor in synchronization with a pulse of an oscillator oscillated by an oscillation start unit and a waiting period is disposed until the driving signal is given to the ultrasonic sensor after being oscillated by the oscillation start unit.

Figure 2:
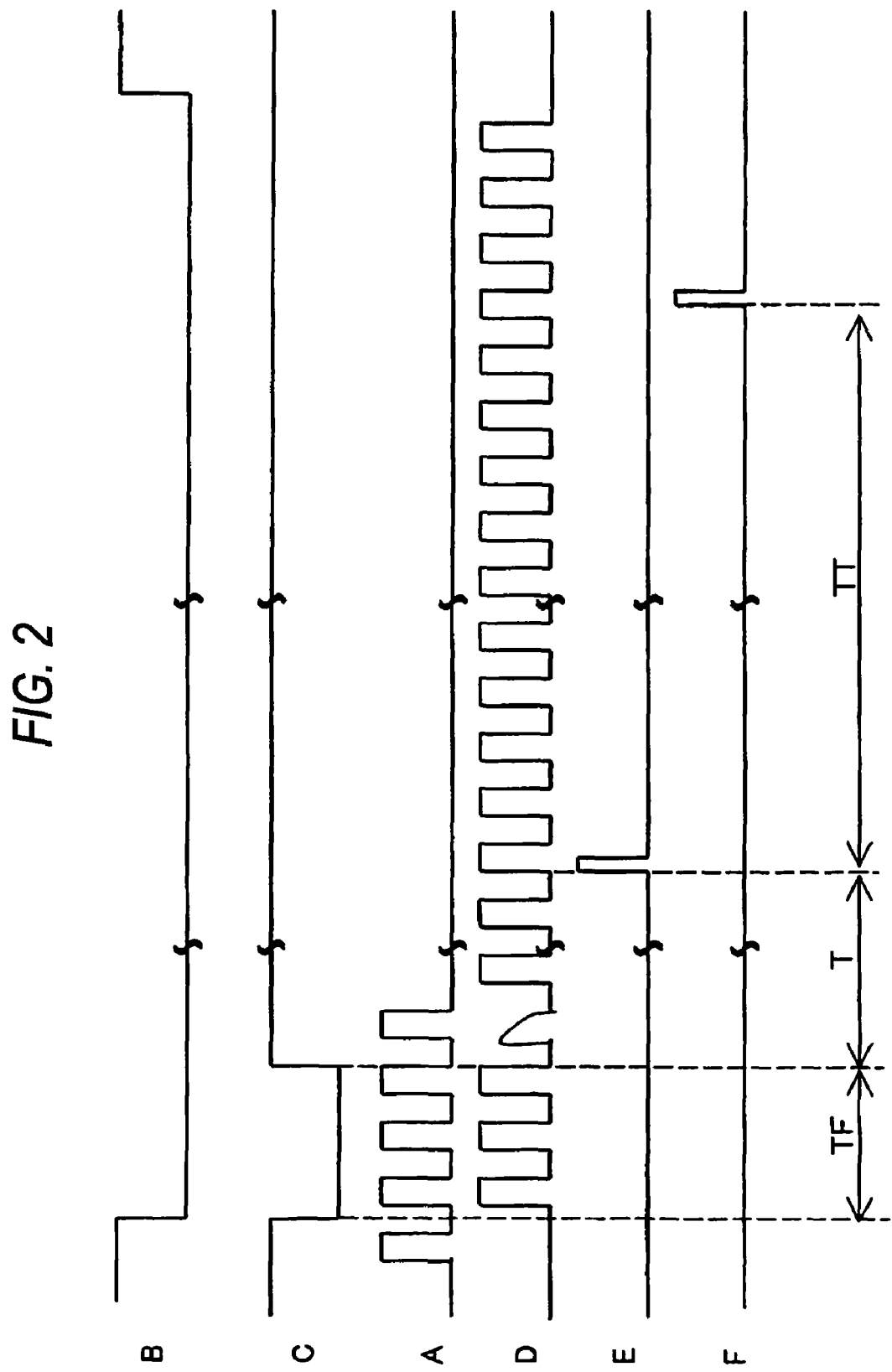
FIG. 2 is a timing chart of the ultrasonic flowmeter of the invention.

FIG. 2 is a timing chart of the ultrasonic flowmeter in the second embodiment of the invention, and represents signals of places of A, B, C, D, E and F described in FIG. 1. B of FIG. 2 is a signal from the calculation processing circuit 59 and is a signal for operation/stop of the oscillator 60. C of FIG. 2 is similarly a signal from the calculation processing circuit 59 and is a signal for defining a period for which the oscillator 60 is energized by pulses of another oscillation unit (ring oscillator) 62. A of FIG. 2 is a pulse signal of this another oscillation unit (ring oscillator). D of FIG. 2 is a pulse signal of the oscillator 60, and the instant that energization from this another oscillation unit (ring oscillator) is stopped, a pulse waveform is somewhat disturbed, but a normal pulse is outputted at once.

E of FIG. 2 is a driving signal of the ultrasonic sensor 51 and the driving signal is generated in synchronization with a pulse signal D of the oscillator 60 of D of FIG. 2. F of FIG. 2 is a signal outputted by the comparison circuit 57 based on a signal received by the ultrasonic sensor 52. The instant that energization from this another oscillation unit (ring oscillator) is stopped, a pulse waveform is somewhat disturbed by a pulse signal of the oscillator 60 of D of FIG. 2, so that time is somewhat required in order to stabilize a pulse frequency. As a result of this, waiting time T is disposed between the signal and the driving signal of the ultrasonic sensor 51 of E of FIG. 2 outputted in synchronization with the pulse signal D of the oscillator 60 of D of FIG. 2.

When a ceramic oscillator is used in an oscillator, waiting time is about $30 \times 10^{-6}$ second. In FIG. 2, time TT represents propagation time of ultrasonic waves and also, time TF represents time for which the oscillator 60 is energized. Since time TF+TT taken to energize the oscillator 60 and output a driving signal is about $50 \times 10^{-6}$ second, as described in the section of "Problems that the Invention is to Solve", with respect to the fact that "when the ceramic oscillator is used, activation of the oscillator becomes extremely quicker than that of the crystal oscillator, but about $200 \times 10^{-6}$ second or more is required still, so that a problem is to accelerate activation of the ceramic oscillator further in order to achieve electric power savings", time can be further reduced to about one-fourth.

According to the second embodiment thus, by disposing the waiting time T until the driving signal is given to the ultrasonic sensors 51, 52 after being oscillated by an oscillation start unit 61, a stable operation can be performed as soon as possible in the case of accelerating an oscillation start of the oscillator 60 by energization of another oscillation unit 62.

Third Embodiment

An ultrasonic flowmeter in a third embodiment of the invention is constructed so that other oscillator B is disposed in addition to an oscillator A used in measurement of propagation time of ultrasonic waves and a pulse cycle of the oscillator A is verified by a pulse of the oscillator B to calibrate propagation time.

Figure 3:
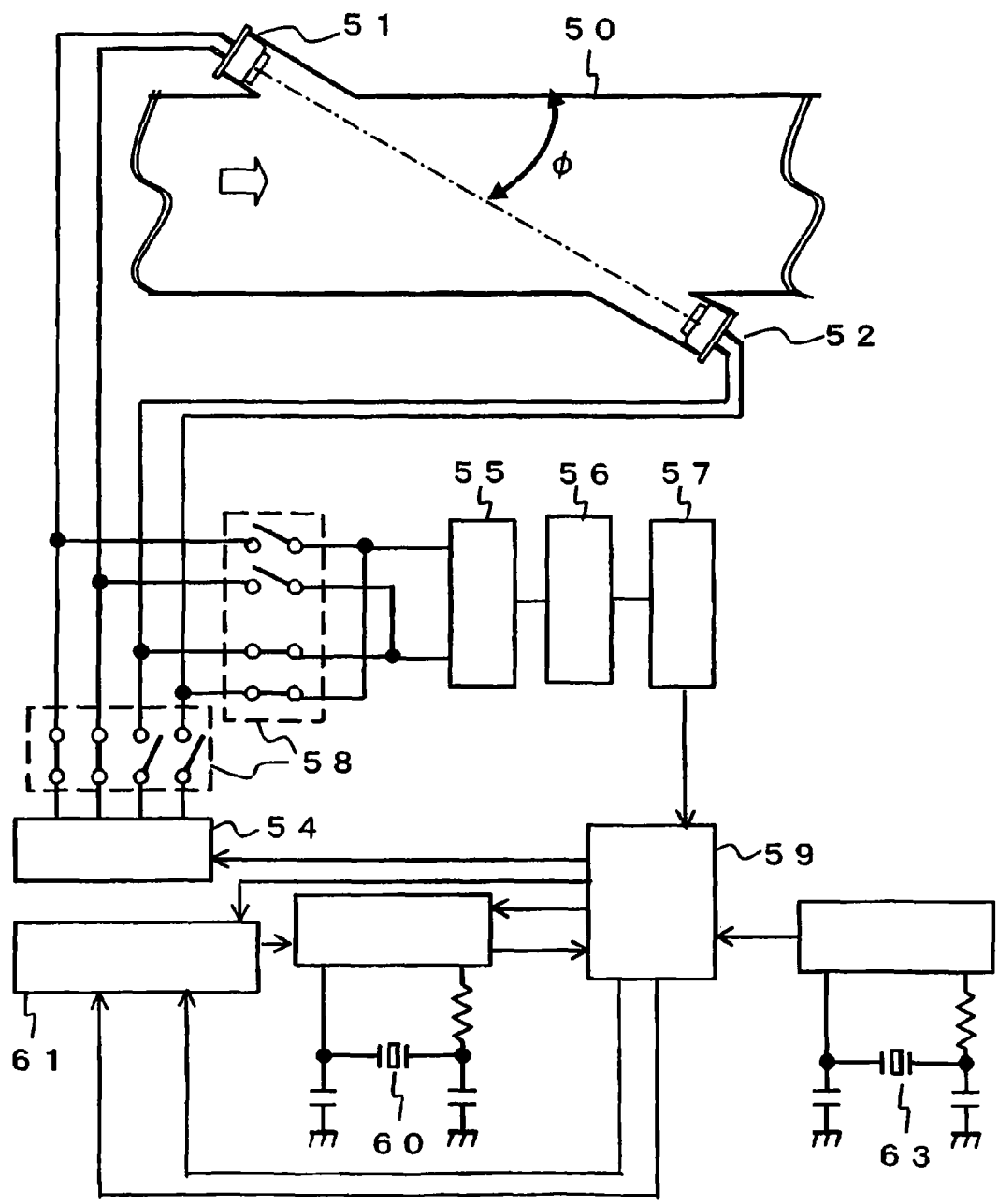
FIG. 3 is a circuit block diagram showing a structure of an ultrasonic flowmeter of the invention.

FIG. 3 is a circuit block diagram showing a configuration of the ultrasonic flowmeter in the third embodiment of the invention, and the circuit block diagram of the ultrasonic flowmeter shown in FIG. 1 is simplified and a part is added. In FIG. 3, an oscillator 60 which is the first oscillator A is used for measuring propagation time of ultrasonic waves and as its oscillation frequency, for example, the oscillation frequency of $4 \times 10^6$ Hz is selected. This oscillator 60 performs intermittent operations and is energized by an oscillation start unit 61 at the time of an oscillation start. An oscillator 63 which is the second oscillator B is an oscillator for generating pulses to form the basis of an operation of a calculation processing circuit 59 and as its oscillation frequency, for example, the oscillation frequency of $32 \times 10^3$ Hz is selected. This oscillator 63 performs continuous operations.

This oscillator 63 is used for a microcomputer constructing the calculation processing circuit 59 and the frequency is low, so that power consumption is small but at such a frequency, a cycle is too long and the oscillator 63 is not used in measurement of propagation time of ultrasonic waves directly.

Figure 4:
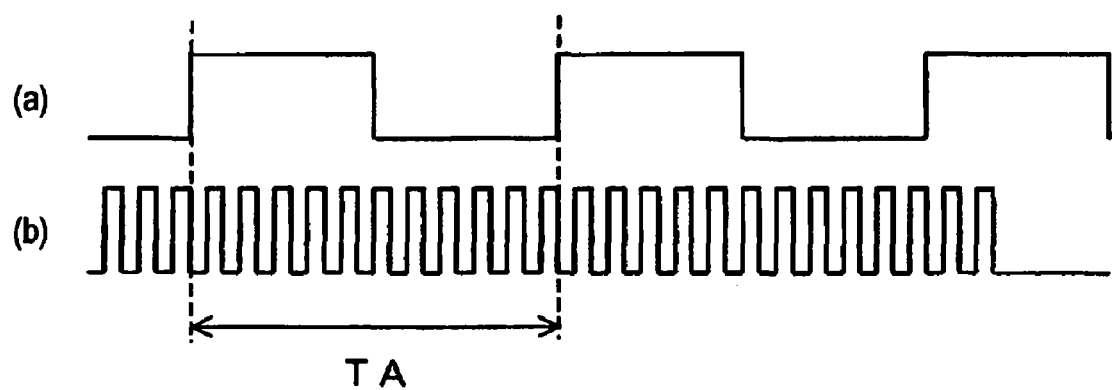
FIG. 4 is a timing chart of the ultrasonic flowmeter of the invention.

In the oscillator 60 which is the oscillator A, a ceramic oscillator is used. In the oscillator 63 which is the oscillator B, a crystal oscillator is used. As described above, frequency accuracy is ±0.5% in the ceramic oscillator while frequency accuracy is ±0.001% in the crystal oscillator, so that the frequency accuracy of the ceramic oscillator is not sufficient for high-accuracy measurement. As a result of this, the ceramic oscillator (oscillator A) is verified by the crystal oscillator (oscillator B). The verification is performed so that as shown in FIG. 4, the number of pulses of the ceramic oscillator (oscillator A) of (b) in FIG. 4 per one cycle TA or plural cycles of the crystal oscillator (oscillator B) of (a) in FIG. 4 is counted and time per one cycle of the ceramic oscillator (oscillator A) is obtained and propagation time of ultrasonic waves obtained by the number of pulses of the ceramic oscillator (oscillator A) is corrected by its value.

According to the third embodiment thus, the ceramic oscillator with quick activation is used in the oscillator A for measurement of propagation time of ultrasonic waves and the crystal oscillator with high oscillation frequency accuracy is used as the oscillator B and a pulse cycle of the oscillator A is verified by a pulse of the oscillator B and thereby, stable measurement of propagation time of ultrasonic waves can be executed instantaneously.

Fourth Embodiment

Figure 5:
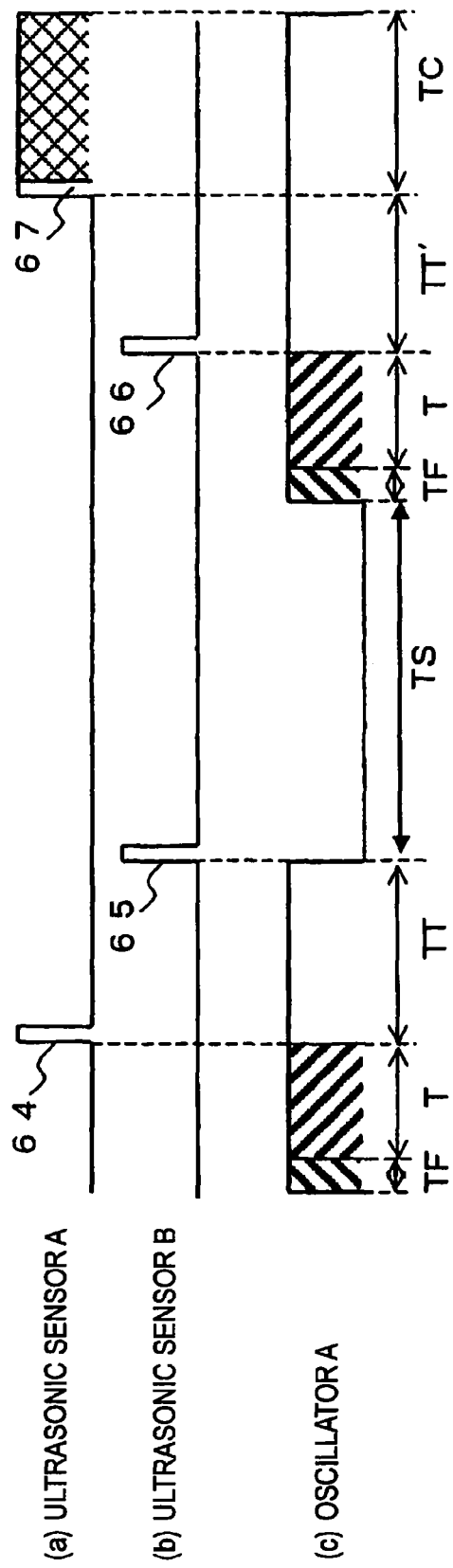
FIG. 5 is a timing chart of an ultrasonic flowmeter of the invention.
Figure 6:
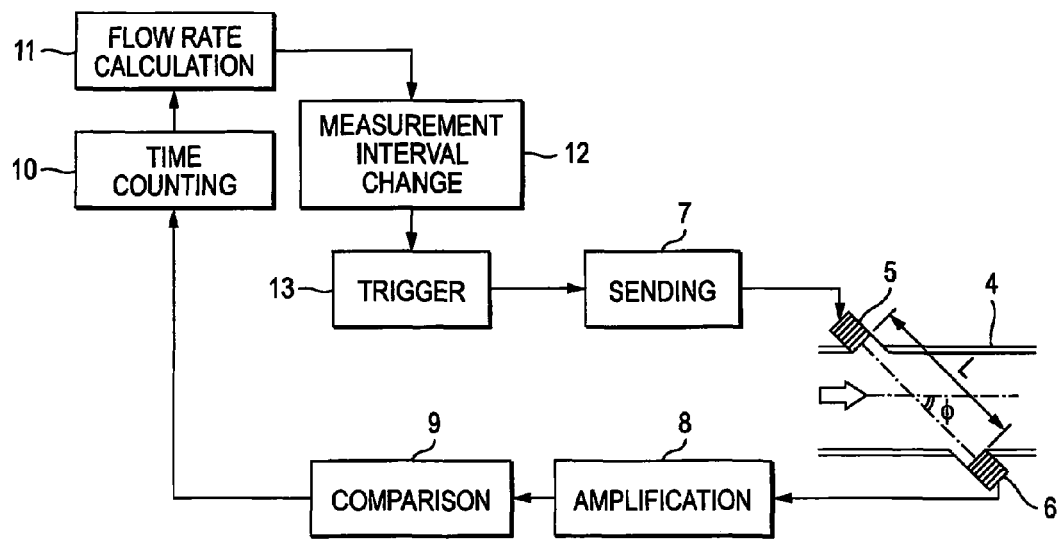
FIG. 6 is a control block diagram showing a configuration of a conventional ultrasonic flowmeter.
Figure 7:
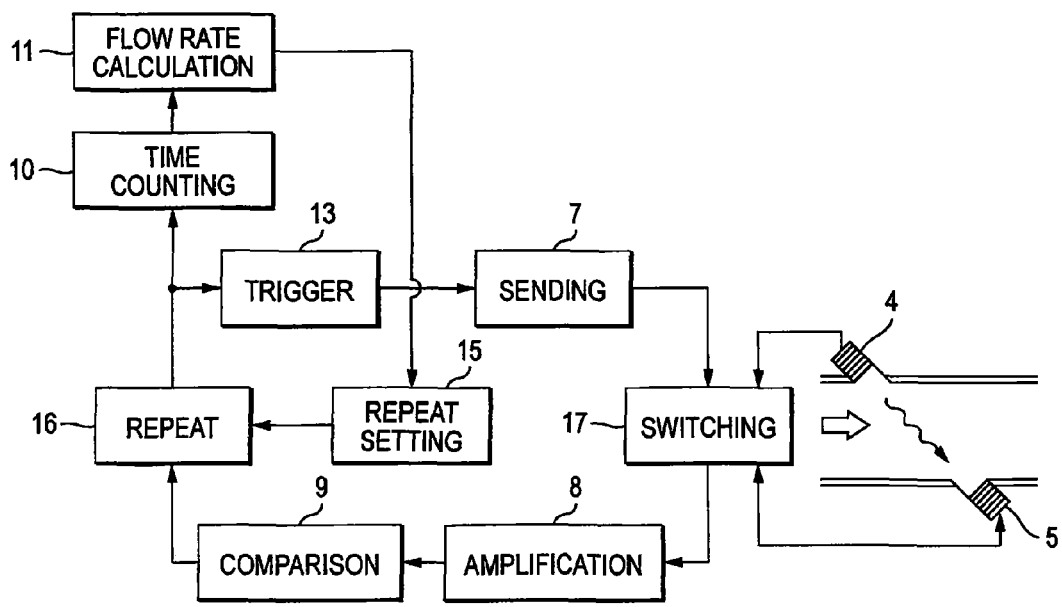
FIG. 7 is a control block diagram showing a configuration of a conventional ultrasonic flowmeter.
Figure 10:
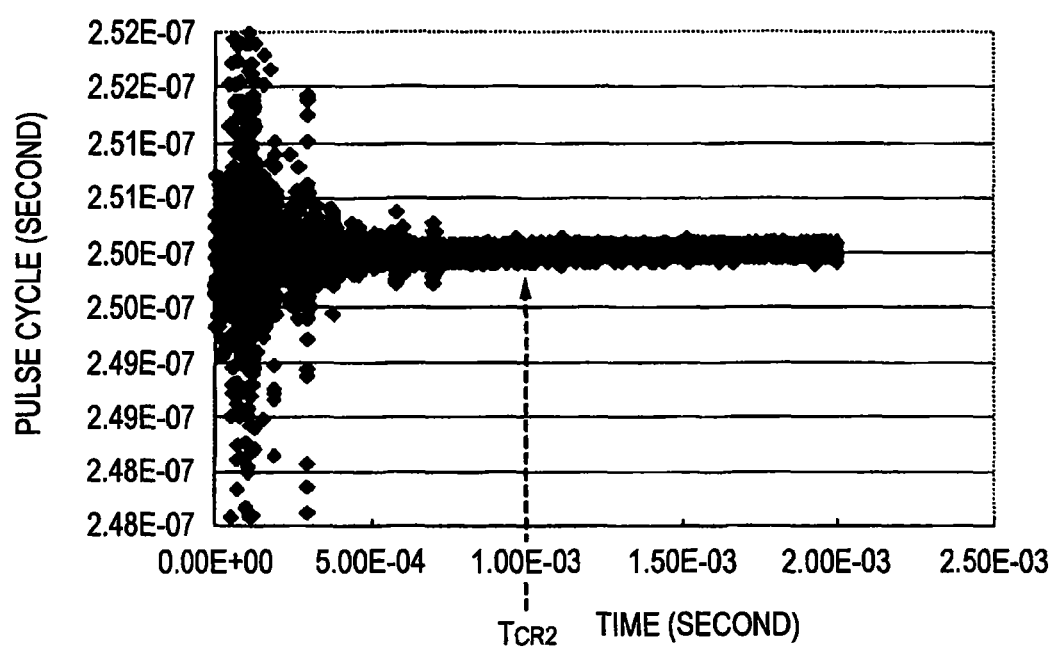
FIG. 10 is a characteristic diagram of the oscillation circuit of the conventional crystal oscillator.
Figure 11:
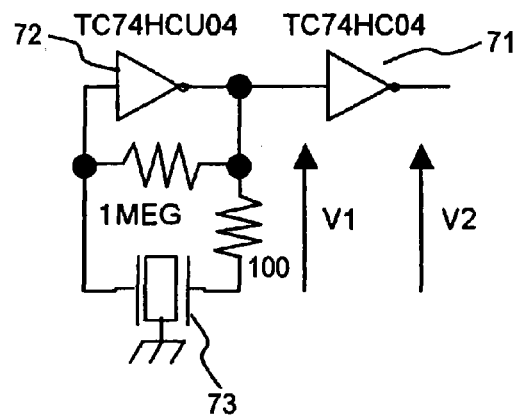
FIG. 11 is an oscillation circuit of a conventional ceramic oscillator.
Figure 12:
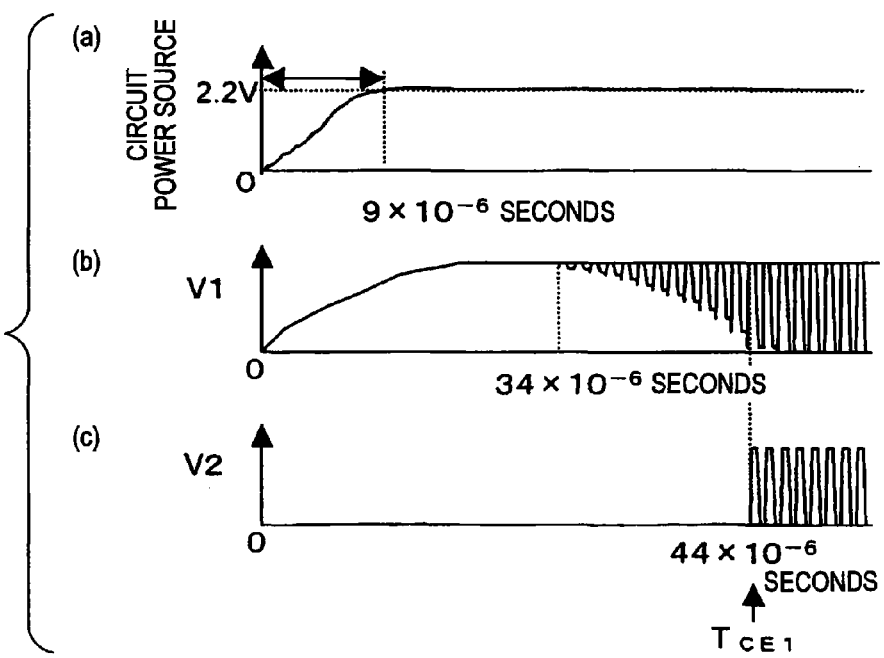
FIG. 12 is a characteristic diagram of the oscillation circuit of the conventional ceramic oscillator.
Figure 13:
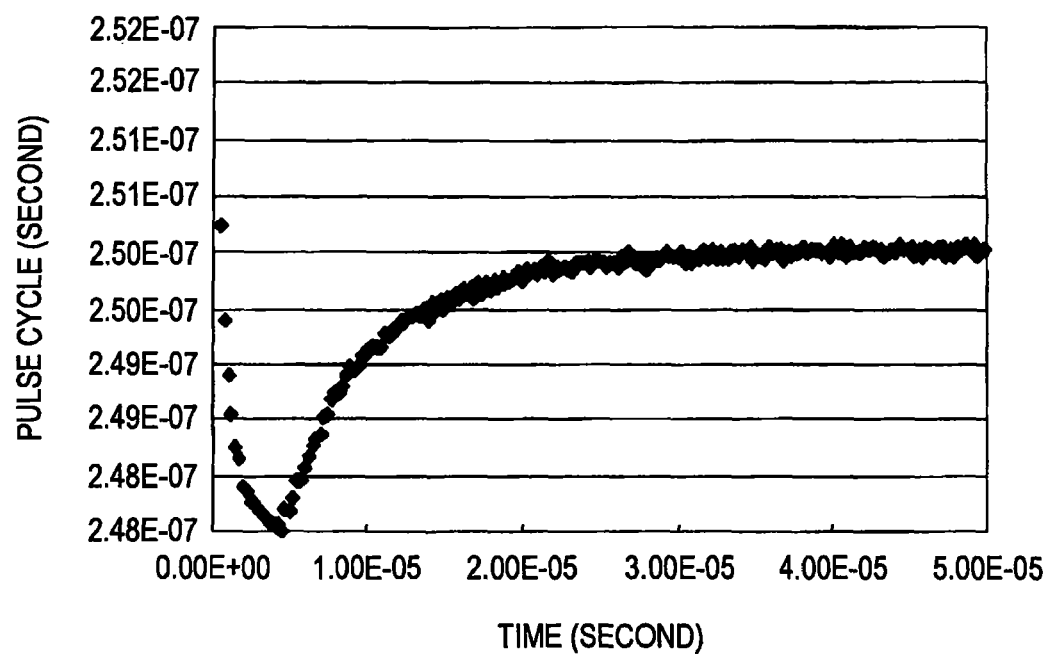
FIG. 13 is a characteristic diagram of the oscillation circuit of the conventional ceramic oscillator.
Figure 14:
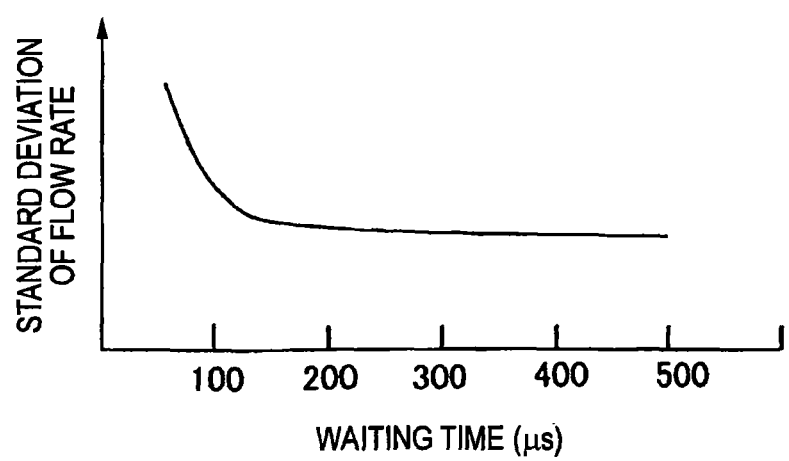
FIG. 14 is a flow rate characteristic diagram measured using the oscillation circuit of the conventional ceramic oscillator.

A fourth embodiment is constructed so that verification of a ceramic oscillator (oscillator A) by a crystal oscillator (oscillator B) is performed continuously after measurement of propagation time of ultrasonic waves. FIG. 5 is a timing chart of an ultrasonic flowmeter in the fourth embodiment of the invention, and (a) in FIG. 5 shows an operation of an ultrasonic sensor A, and (b) in FIG. 5 shows an operation of an ultrasonic sensor B, and (c) in FIG. 5 shows an operation of the oscillator A.

In order to obtain pulse stability after time TF for which the ceramic oscillator (oscillator A) is energized, waiting time T is taken and sending 64 is performed from the ultrasonic sensor A. A signal of the ultrasonic sensor A is received 65 by the ultrasonic sensor B and propagation time TT of ultrasonic waves is measured. Thereafter, the ceramic oscillator (oscillator A) is stopped for time TS.

The ceramic oscillator (oscillator A) is again energized for time TF and after waiting time T, sending 66 is performed from the ultrasonic sensor B. A signal of the ultrasonic sensor B is received 67 by the ultrasonic sensor A and propagation time TT' of ultrasonic waves is measured. Thereafter, the ceramic oscillator (oscillator A) operates continuously for time TC in order to perform verification of the ceramic oscillator (oscillator A) by the crystal oscillator (oscillator B).

In the fourth embodiment thus, by performing verification continuously without stopping the ceramic oscillator (oscillator A), it is unnecessary to again energize the ceramic oscillator (oscillator A) and take the waiting time, so that electric power savings can be achieved.

Fifth Embodiment

A fifth embodiment is constructed so that waiting time taken to obtain pulse stability after the ceramic oscillator (oscillator A) described above is energized is given as a constant time. Since the time taken to obtain pulse stability varies depending on variations in characteristics between individual pieces of the ceramic oscillators or temperature, time necessary for stability including these factors is previously measured and the waiting time is given as a fixed value in a range capable of sufficiently covering these factors.

By this configuration, the waiting time can be set the most simply, so that a software scale or a circuit element scale of a calculation processing circuit can be reduced.

Sixth Embodiment

A sixth embodiment is constructed so that waiting time is determined by verifying a pulse cycle of an oscillator. That is, during the waiting time during which pulse stability is waited after a ceramic oscillator (oscillator A) is energized, a cycle of the ceramic oscillator (oscillator A) is verified by a crystal oscillator (oscillator B) and it is decided that the pulse stability of the ceramic oscillator (oscillator A) is obtained when a verification error is within a certain range based on a verification result.

According to this configuration, a software scale or a circuit element scale of a calculation processing circuit for setting the waiting time becomes large, but there is an advantage capable of properly setting the waiting time.

The invention has been described in detail with reference to the particular embodiments, but it is apparent to those skilled in the art that various changes or modifications can be made without departing from the spirit and scope of the invention.

The present application is based on Japanese patent application (patent application No. 2006-351251) filed on Dec. 27, 2006, and the contents of the patent application are hereby incorporated by reference.

INDUSTRIAL APPLICABILITY

As described above, an ultrasonic flowmeter according to the invention can be expanded into uses of a business or household ultrasonic type gas flow rate measuring apparatus (gas meter) for measuring a flow rate of natural gas or liquefied petroleum gas requiring accurate measurement.

The invention claimed is:

1. An ultrasonic flowmeter comprising:
   an ultrasonic sensor that sends and receives ultrasonic waves in a flow path;
   an oscillator that generates an oscillation of a predetermined frequency; and
   an oscillation start unit comprising an oscillation unit which outputs pulses applied to the oscillator for a certain period to thereby accelerate stability of the oscillator, wherein pulses of the oscillator oscillated by the oscillation start unit are used to measure a propagation time of the ultrasonic waves.

2. The ultrasonic flowmeter as claimed in claim 1, wherein a driving signal is given to the ultrasonic sensor in synchronization with pulses of the oscillator oscillated by the oscillation start unit and a waiting period is provided before the driving signal is given to the ultrasonic sensor after the oscillator becomes oscillated by the oscillation start unit.

3. The ultrasonic flowmeter as claimed in claim 2, wherein the waiting period is set at a constant time.

4. The ultrasonic flowmeter as claimed in claim 2, wherein the waiting period is determined based on a result of verifying the pulse cycle of the oscillator.

5. The ultrasonic flowmeter as claimed in claim 1, wherein a ceramic oscillator is used in the oscillator.

6. The ultrasonic flowmeter as claimed in claim 5, further comprising another oscillator in addition to the oscillator, wherein a pulse cycle of the oscillator is verified by pulses of said another oscillator to correct the measured propagation time.

7. The ultrasonic flowmeter as claimed in claim 6, wherein the pulse cycle of the oscillator is verified continuously the propagation time is measured.

8. An ultrasonic flowmeter comprising:
   an ultrasonic sensor that sends and receives ultrasonic waves in a flow path;
   an oscillator that generates an oscillation of a predetermined frequency; and
   an oscillation start unit that accelerates stability of the oscillator,
   wherein a driving signal is given to the ultrasonic sensor in synchronization with pulses of the oscillator oscillated by the oscillation start unit to use pulses of the oscillator oscillated by the oscillation start unit to measure a propagation time of the ultrasonic waves, and a waiting period is provided before the driving signal is given to the ultrasonic sensor after the oscillator becomes oscillated by the oscillation start unit.

* * * * *

UNITED STATES PATENT AND TRADEMARK OFFICE
CERTIFICATE OF CORRECTION

| | | |
|---|---|---|
| PATENT NO. | : 7,987,731 B2 | Page 1 of 1 |
| APPLICATION NO. | : 12/521443 | |
| DATED | : August 2, 2011 | |
| INVENTOR(S) | : Daisuke Bessyo et al. | |

It is certified that error appears in the above-identified patent and that said Letters Patent is hereby corrected as shown below:

<u>In the Claims</u>

In column 10, claim 2, line 16, immediately after "start unit" insert --,--.

In column 10, claim 7, line 32, after "is verified continuously" insert --after--.

Signed and Sealed this

Thirteenth Day of December, 2011

David J. Kappos
*Director of the United States Patent and Trademark Office*